United States Patent [19]

Lardy et al.

[11] Patent Number: 5,540,632
[45] Date of Patent: Jul. 30, 1996

[54] CONTROL PROCESS AND CONTROL ARRANGEMENT FOR A CONTINUOUSLY VARIABLE SPEED TRANSMISSION

[75] Inventors: Patric Lardy, Weil der Stadt; Willi Seidel, Eberdingen; Heinz Stehle, Weissach; Joseph Petersmann, Wimsheim, all of Germany

[73] Assignee: Dr. Ing. h.c.F. Porsche AG, Germany

[21] Appl. No.: 419,647

[22] Filed: Apr. 7, 1995

[30]    Foreign Application Priority Data

Apr. 7, 1994 [DE] Germany ............... 44 11 940.2

[51] Int. Cl.⁶ ............ F16H 59/06; F16H 59/14; B60K 41/12
[52] U.S. Cl. .................................................. 477/43
[58] Field of Search ......................... 477/42, 43

[56]    References Cited

U.S. PATENT DOCUMENTS 4,671,138  6/1987  Nobumoto et al. .............. 477/43
4,715,258  12/1987  Shigematsu et al. .............. 477/43
4,976,170  12/1990  Hayashi et al. .................... 477/43

*Primary Examiner*—Dirk Wright
*Attorney, Agent, or Firm*—Evenson, McKeown, Edwards & Lenahan

[57]    ABSTRACT

This invention provides a method and apparatus for controlling a continuously variable speed transmission connected with an internal-combustion engine according to one or several characteristic control curves. A transmission ratio of the transmission is automatically set according to the position of a power control element. In order to be able to operate the internal-combustion at its consumption-optimal point, a "constant driving method" which requires only a low reserve of tractive force is detected, and transmission ratio is adjusted in response thereto, so that the internal-combustion engine is operated in its point of the lowest specific fuel consumption for the existing operating point of the vehicle.

10 Claims, 4 Drawing Sheets

CONTROL PROCESS AND CONTROL ARRANGEMENT FOR A CONTINUOUSLY VARIABLE SPEED TRANSMISSION

BACKGROUND AND SUMMARY OF THE INVENTION

This invention relates to a control process and a control arrangement for a continuously variable speed transmission.

As a rule, several characteristic control curves are provided in such control arrangements. These characteristic control curves permit various operating modes of the continuously variable speed transmission, from a power-oriented operation to a consumption-optimized operation. However, even with a consumption-optimized characteristic control curve, transient operation of the vehicle, and particularly acceleration, must also be possible. Therefore, even a consumption-optimized characteristic control curve cannot achieve the minimum possible consumption for the selected operating point because the low reserve of motive force at that point makes acceleration of the vehicle almost impossible.

It is therefore an object of the invention to provide a control process and apparatus for a continuously variable speed transmission by means of which the internal-combustion engine can also be operated in its consumption-optimal points.

This object is achieved according to the invention, by recognizing a driving situation, referred to herein as a "constant driving method", in which only a low motive force reserve is required. When such an situation exists, according to the invention, the transmission ratio is adjusted so that the internal-combustion engine is then operated at its point of the lowest specific fuel consumption for the existing operating point of the vehicle. Since the invention operates as a supplement to a conventional basic control unit, the inherent conflict between the need for optimal consumption, on the one hand, and an acceleration capacity appropriate with respect to the traffic, on the other hand, can be resolved in that consumption-optimal operation is set only in particularly suitable (stable) driving situations.

In further advantageous embodiments of the invention, the "constant driving method" is recognized by means of testing steps. That is, it is determined whether there is a reserve of motive force. (The vehicle must not be operated at the limit of its output capacity anyhow.) It is also tested whether the power control element, for example, a throttle valve, is actuated so that it can be determined whether the driver is capable of influencing the power of the internal-combustion engine. Finally, it is tested whether there is an essentially constant driving; that is, whether, at the moment, the rates of change of the driving speed and of the position of the power control element are low.

To adjust the transmission ratio, a consumption-optimal desired rotational drive speed is first determined, and then, after a predetermined transition function (for example, a PT1 or PT2 felter), the actual rotational drive speed is adjusted to the desired speed. This approach takes into account the fact that the driver of the vehicle is indirectly involved in the events because, in order to maintain the power, and therefore the driving speed of the vehicle, he must change the position of the power control element so that the power of the internal-combustion engine is maintained. The driver may also of course be replaced by an automatic speed control system, if it exists. In either case, the predetermined transition function is required in order to be able to carry out the change of the transmission ratio such that the driver or the speed control system, for the adaptation, can follow the position of the power control element as easily as possible. As a result, jerky transitions and annoyance to the driver are avoided. With an ideal design of the transition function, the change of the transmission ratio can take place in a manner such that the driver does not even notice it.

In the suggested test for steady-state driving, during an extended monitoring period, the integrals of the rates of change of the vehicle driving speed and the position of the power control element are monitored. This ensures that a change of the transmission ratio which, as mentioned above, reduces the consumption, but also the acceleration capacity of the vehicle, is initiated only when the driving situation in fact allows it. For this purpose, it is not the integral of the changes which is formed but rather the integral of the rate of the change, in order to detect all changes, whether they are positive or negative.

In summary the invention provides an arrangement for recognizing a driving situation such as may be found, for example, on limited access highways in moderate traffic, where there is little need for a higher output capacity of the internal-combustion engine caused by gradients, passing maneuvers or driving at or near the maximum speed. Advantageously, no separate adjusting devices are required; rather, an existing control arrangement for a continuously variable speed transmission can be supplemented by the invention without any further expenditures. The required readjustment of the position of the power control element takes place in a particularly simple manner by the driver himself or, in a slightly more comfortable manner, by means of an existing speed control system.

Other objects, advantages and novel features of the present invention will become apparent from the following detailed description of the invention when considered in conjunction with the accompanying drawings.

DETAILED DESCRIPTION OF THE DRAWINGS

Figure 3:
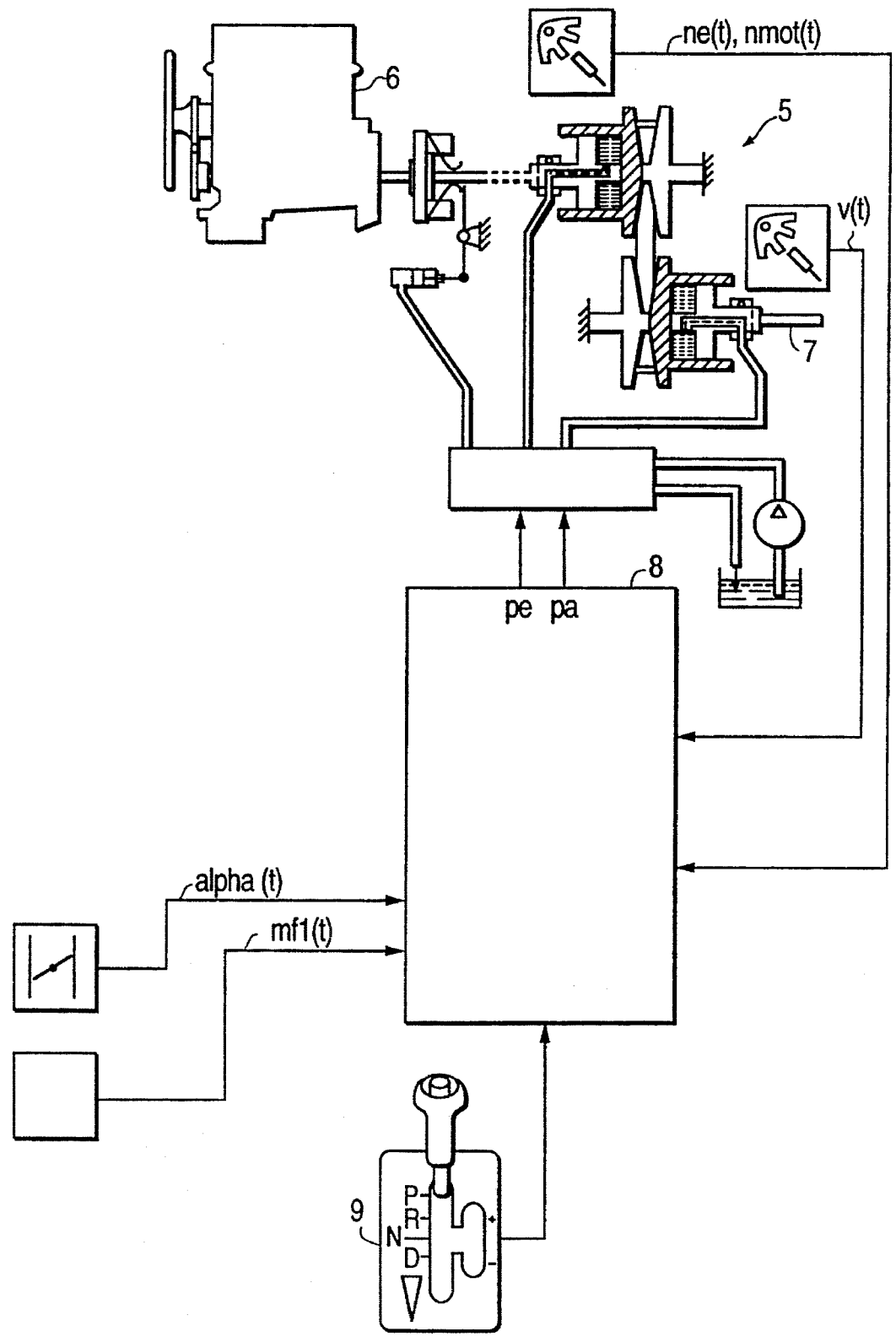
FIG. 3 is a schematic depiction of an engine, transmission and related sensors and controls according to the invention.

According to the invention, a continuously variable speed transmission 5, coupled to an internal-combustion engine 6, is arranged in a vehicle as shown in FIG. 3, and acts upon the wheels (not shown) of the vehicle, which are coupled to it by a drive line 7. The continuously variable speed transmission 5 is connected with a control arrangement 8 which detects different operational parameters of the vehicle and a signal from the selector lever 9, and sets an engagement of the continuously variable transmission in response thereto. In one embodiment, the control arrangement detects the following quantities: a throttle valve position alpha(t) as the position of a power control element of the internal-combustion engine; a driving speed v(t) which is equivalent to a rotational output speed na(t); a rotational engine speed nmot(t) of the internal-combustion engine which, in the driving operation, is equal to a rotational input speed ne(t) of the transmission; and a motive force number mf1(t) which assumes a value between 0 and 1 and constitutes a measure of the actual motive force utilization of the vehicle (ratio of power requirement, that is, throttle valve position alpha(t) to the change of the driving speed v(t)). The value mf1=0, for example, indicates a very low utilization of motive force, while the value mf1=0.5 indicates a balance between the power demand and the motive force; and the value mf1=1 indicates a considerable lack of motive force. Finally, the ratio of the rotational input speed ne(t) and the rotational output speed na(t) results in a transmission ratio i.

Figure 1:
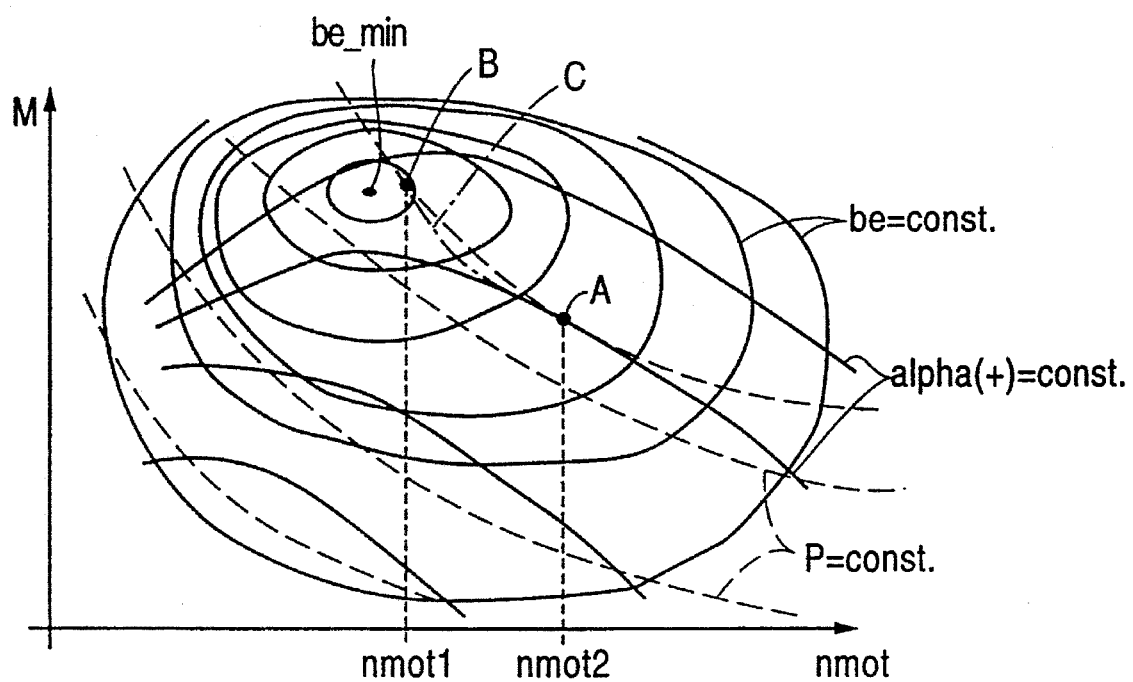
FIG. 1 is an engine characteristic diagram which is used to explain the effect of the process according to the invention.

The process according to the invention is implemented in the form of a function, the effect of which is illustrated in FIG. 1, described later. This function is commenced at regular intervals, within the framework of a conventional basic control unit which is not shown. Such controls per se, and the manner of their operation, are well known to those skilled in the art, and do not constitute a part of the present invention. These controls commonly include means for detecting and compensating for surface grades (hills), arrangements for preventing upshifting of the transmission gear ratio in certain driving conditions, and the like.

Figure 2:
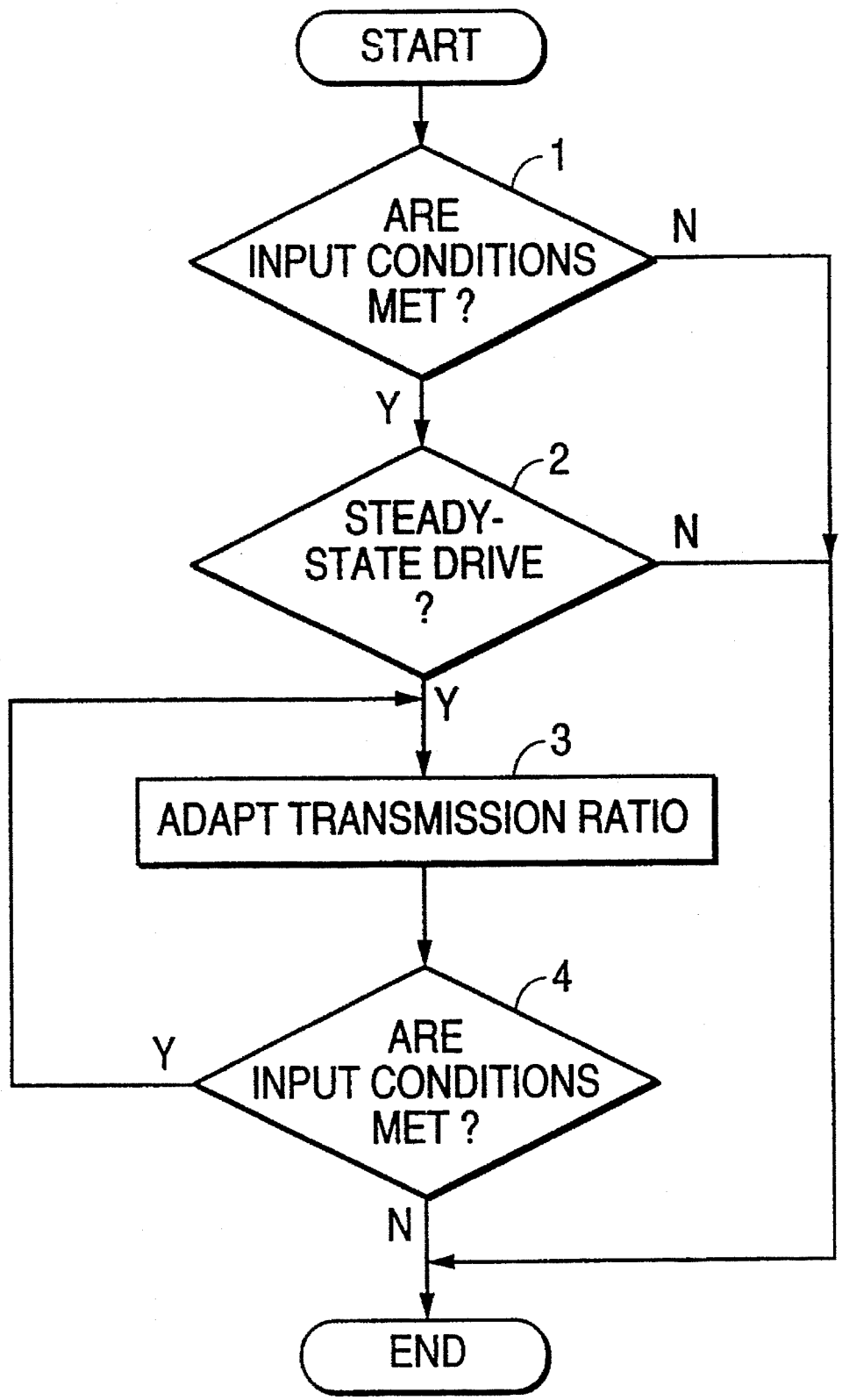
FIG. 2 is a flow chart which illustrates the operation of the transmission control arrangement according to the invention.

After the function is commenced, the steps illustrated in FIG. 2 are carried out, as follows. In step 1, the following input conditions are:

Is only the basic control itself active? (That is, are no special functions, such as a hill program, an upshift prevention, or similar functions operating?)

Is the characteristic motive force number mf1 below a low limit value; in this case 0.1?

Is the throttle valve actuated? (That is, is the throttle valve position alpha(t) larger than 5%?)

Is the rate of change of the throttle valve position during the previous second very small (in this case <2%)?

Is the rate of change of the driving speed v(t) during the previous second very small (in this case <1 km/h)?

At the point in time when the function is commenced, the above-mentioned conditions must all be met simultaneously; otherwise the function is terminated immediately. To simplify determination of the change of driving speed v(t) and of the throttle valve position alpha(t), the time period during which these changes are determined corresponds to the time period between consecutive commencement of the function so that, for each operation of the function the actual value for the driving speed v(t) or the throttle valve position alpha(t) can be compared with their value at the preceding function invocation, and no intermediate function invocations are necessary for determining these values.

If the input conditions in step 1 are met, the function is continued in step 2 in which it is determined whether steady-state driving does, in fact, exist. For this purpose, it is necessary to integrate the rates of the changes of the driving speed v(t) and the throttle valve position alpha(t). As described for step 1, in order to simplify the control sequence in the control device the integral is not calculated mathematically; rather, it is determined in time steps which correspond to the time interval of two invocations of the function. Therefore, in a strict sense, the sums of the rates of change of the values to be monitored are determined between two function invocations. In the embodiment, this test takes a period of approximately 10 seconds, and the integrals or sums must afterwards have a value of <5% for the throttle valve position alpha(t), and a value <3 km/h for the driving speed v(t).

If this condition is not met, the function is terminated immediately after step 2. Otherwise, the actual adjustment of the transmission ratio i takes place in step 3. For this purpose, by means of a characteristic diagram, an engine power P is determined, based on the actual throttle valve position alpha(t) and to the actual rotational engine speed nmot(t). Subsequently, a desired rotational engine speed n__des at which, in the case of the existing engine power P, the internal-combustion engine has its lowest specific fuel consumption, is determined. (A look up table, a characteristic curve, or similar known device is used for this purpose.) Thereafter, a desired transmission ratio i__des can be determined from the desired rotational engine speed n__des and the rotational output speed na(t).

After these preparatory measures, the transmission ratio i is adjusted. In particular, after a transition function, the actual transmission ratio i is adjusted toward the desired transmission ratio i__des in a conventional manner. In this case, the transition function must be dimensioned as a function of the operating parameters of the vehicle. Particularly, the rate of change of the rotational engine speed nmot(t) and the resulting rate of change of the driving speed v(t) must, on the one hand, be dimensioned to be high enough so that the driver notices this change and will readjust the throttle valve position alpha(t) correspondingly, but, on the other hand, not so low that it surprises the driver. For a vehicle on which the embodiment is based, tests have demonstrated that a change of the rotational engine speed of 10 r.p.m. in 1 sec is a value at which the above-mentioned requirements are met well. Similar interpretation criteria arise when a speed control system is provided in the vehicle. However, this will result in different values because the reaction of this speed control system must now be considered.

As illustrated in step 4, in the meantime, it is continuously (that is, at short intervals) tested whether the above-mentioned input conditions are still met. If not, the adaptation of the transmission ratio i is terminated and the function is concluded.

The function illustrated in FIG. 2 is again followed by a transition filter (not shown) which, if an adjustment of the transmission ratio i has taken place, determines the transition to the transmission ratio i selected by the basic control. This transition is determined according to the changed operational parameters. For example, the transmission ratio will fall abruptly if the throttle valve position alpha(t) suddenly becomes maximal, for example, for a passing operation.

The effect of the described function is illustrated in FIG. 1, which shows a characteristic engine diagram. Such diagrams are known per se, in which an engine torque M is entered on the ordinate above the rotational engine speed nmot, which is on the abscissa. The closed conchate lines are lines of constant specific fuel consumption (be); as fuel consumption falls, these lines become closer to a point of minimal fuel consumption (be__min). Solid lines of a constant throttle valve position alpha(t) and interrupted lines of a constant engine power P are also entered.

As an example, when the function is initiated, the internal-combustion engine is operating at point A. After the initiation of the function (that is, in the case of a constant driving method with a high tractive force reserve and a recognized steady-state driving), the function determines that, for the given engine power P at point B, the specific fuel consumption (be) is the lowest and the efficiency is therefore the highest. Therefore, the function starts to adjust the transmission ratio i such that the rotational engine speed nmot(t), based on the rotational engine speed nmot1 existing at the start of the function, will fall. As long as the driver does not intervene, the engine power P will follow the curve of the constant throttle valve position alpha(t) which intersects with point A. It is only when a noticeable drop of the driving speed v(t) occurs that the driver's attention is drawn to the change, and he will change the throttle valve position alpha(t) in order to increase the engine power P again and finally reach his original driving speed v(t) again. This operation will be continued until point B is reached so that, on the whole, that is, taking into account the driver's influence, a course of approximately the shape of Line C is obtained.

Figure 4:
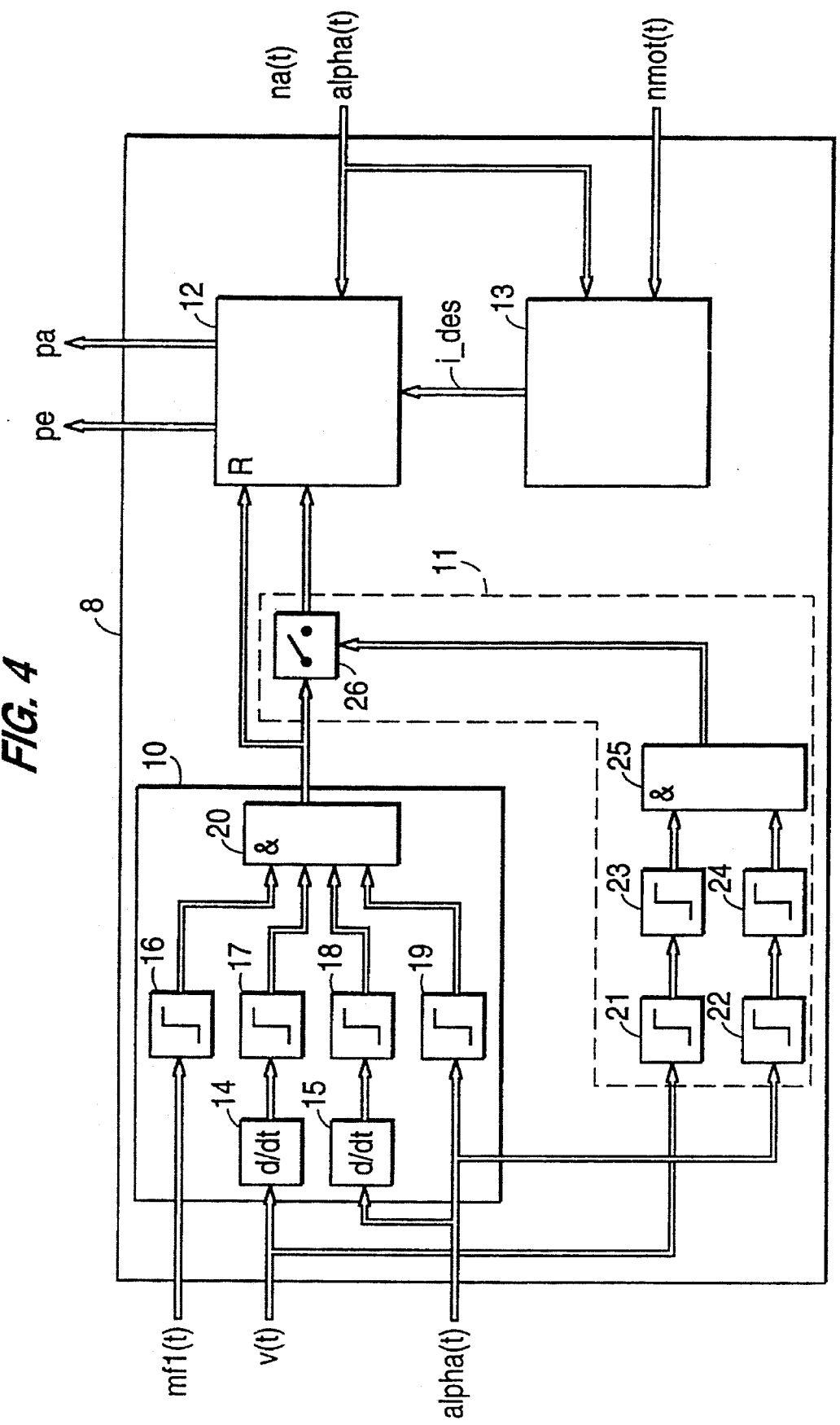
FIG. 4 shows an embodiment of the control unit 8 in FIG. 3.

As shown in FIG. 4, one possible control arrangement 8 for execution of the described function consists of a constant driving detection unit 10, a testing device 11, a computing device 12 for controlling adjustment of a transmission ratio and a basic control unit 13.

The basic control unit 13 determines a desired transmission ratio i_des based on the throttle valve position alpha(t) and the rotational engine speed nmot(t). The computing device 12 will normally engage the variable speed transmission 5 in response to the desired transmission ratio i_des by setting its outputs pe and pa upon receipt of a signal from the constant driving detection unit 10, the computing device 12 adjusts the actual transmission ratio i in a direction which decreases fuel consumption of the internal combustion engine 6 while maintaining a constant power output, until a point of minimal fuel consumption for such power output is reached.

The constant driving detection unit 10 compares operating parameters of the vehicle with predetermined values therefore to detect a constant driving method, and emits a signal when such a driving method is detected. In the embodiment shown, these operating parameters are the motive force number mf1(t), the throttle valve position alpha(t), the rate of change of the throttle valve position alpha(t) and the rate of change of the driving speed v(t).

The testing device 11 is provided between the constant driving detection unit 10 and the computing device 12, and transmits the signal emitted by the former only when it has recognized a steady-state drive. To recognize a steady-state drive the testing device 11 compares the amount of change of the throttle valve position alpha(t) and the amount of change of the driving speed v(t) with predetermined values therefore.

The signal emitted by the constant driving detection unit 10 is additionally directly fed to a reset input R of the computing device 12, so the computing device 12 is deactivated when the constatn driving detection unit 10 no longer detects a steady-state driving method. In this case, the driving detecting unit 10 works as an additional monitoring device assigned to the computing device 12.

The driving detection unit 10 includes two differentiators 14, 15, which calculate the rate of change of the throttle valve position alpha(t) and the rate of change of the driving speed v(t), respectively. All four operating parameters are then fed to comparing devices 16 to 19, which emitting a signal when the monitored operating parameter exceeds a limit value. The signals of the comparing devices 16 to 19 are coupled to an AND-circuit 20.

The testing device 11 consists of two integrators 21, 22, which form the integral of the throttle valve position alpha(t) and the rate integral of the driving speed v(t), respectively.

Comparing devices 23, 24 compare the signals of the integrators 21, 22 with upper limit values. The signals emitted by the comparators 23, 24 when the upper limit values are not reached are fed to an AND-circuit 25. A switch 26, which selectively couples the signal output by the driving detection unit 10 to the computing device 12, is controlled by the AND-circuit 25.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for controlling a continuously variable speed automatic transmission connected to an internal combustion engine in a vehicle having a control unit which automatically sets a transmission ratio in accordance with at least one characteristic curve, based on position of a power control element, said method comprising the steps of:

detecting the existence of a constant driving method;

in response to the existence of a constant driving method, adjusting a transmission ratio of said transmission in a direction which decreases fuel consumption of said internal combustion engine while maintaining a constant power output until a point of minimum fuel consumption for such power output is reached.

2. Control process according to claim 1 wherein the step of detecting the existence of the constant driving method comprises the further steps of:

determining whether a reserve of motive force exists;

determining whether a power control element for said engine is operated;

determining whether an actual rate of change of position of the power control element is below a first preset value; and determining whether the actual rate of change of a driving speed is below a second preset value.

3. Control process according to claim 1 wherein adjustment of the transmission ratio comprises the steps of:

determining a consumption-optimal desired rotational drive speed as a function of position of the power control element and of a rotational output speed; and adjusting the transmission ratio such that a difference between the desired rotational drive speed and the actual rotational drive speed is reduced at a predetermined rate of change.

4. Control process according to claim 1 further comprising, between the steps of detecting the constant driving method and adjusting the transmission ratio, the additional step of recognizing a steady-state drive by means of the substeps of:

determining whether, during a predetermined monitoring period, an integral of a rate of change of position of the power control element is lower than a limit value; and determining whether, during a predetermined monitoring period, an integral of a rate of change of driving speed is lower than a limit value.

5. Control process according to claim 1 wherein the step of adjusting the transmission ratio is terminated when the constant driving method no longer exists.

6. Control arrangement for a continuously variable speed transmission connected with an internal combustion engine of a vehicle, in which a ratio of the transmission is selected in accordance with at least one characteristic curve, based on a position of a power control element for said internal combustion engine, said arrangement comprising:

a constant driving detection unit for comparing operating parameters of said vehicle with predetermined values therefor, to detect a constant driving method; and a computing device for controlling adjustment of a transmission ratio to a desired value in response to detection of a constant driving method by said constant driving detection unit, said computing device adjusting said transmission ratio in a direction which decreases fuel consumption of said internal combustion engine while maintaining a constant power output until a point of minimum fuel consumption for such power output is reached.

7. Control arrangement according to claim 6 wherein the constant driving detection unit comprises a first comparison unit for a characteristic tractive force number, a second comparison unit for position of the power control element, a third comparison unit for a rate of change of position of the power control element, a fourth comparison unit for a rate of change of a driving speed, and a linking device for the signals of the respective comparison units, the first, third and fourth comparison units each emitting a signal when a monitored value falls below a limit value, the second comparison unit emitting a signal when a monitored value exceeds limit value, and the linking device generating an output signal when signals are emitted from all comparison units.

8. Control arrangement according to claim 6 wherein the computing device determines a consumption-optimal desired rotational drive speed as a function of the position of the power control element and of a rotational output speed of the transmission, and computes a transmission ratio such that a difference between the desired rotational drive speed and the actual rotational drive speed is reduced at a predetermined rate of change.

9. Control arrangement according to claim 6 wherein a testing device is provided, in addition, between the constant driving detection unit and the computing device which will transmit the signal of the constant driving detection unit only when it has recognized steady-state driving, the testing device comprising a first integrator for forming an integral of the rate of change of position of the power control element, a second integrator for forming the integral or the rate of the change of driving speed, a fifth comparison unit for comparing the signal of the first integrator with an upper limit value, and a sixth comparator for comparing the signal of the second integrator with an upper limit value.

10. Control arrangement according to claim 9 wherein a monitoring device is assigned to the computing device, which monitoring device has another testing unit for testing the constant driving method, and thereupon emits a signal which directly deactivates the computing device.

* * * * *